United States Patent

Antoszewski et al.

[11] Patent Number: 4,670,974
[45] Date of Patent: Jun. 9, 1987

[54] WINDSHIELD INSERTION SYSTEM FOR A VEHICLE ON A MOVING CONVEYOR APPARATUS

[75] Inventors: Richard S. Antoszewski, Glenshaw; F. Ronald Falise, Penn Hills Township, Allegheny County; Francis J. Sciulli, Crafton; Gregory M. Toto, Mt. Lebanon, all of Pa.

[73] Assignee: Westinghouse Electric Corp., Pittsburgh, Pa.

[21] Appl. No.: 795,687

[22] Filed: Nov. 6, 1985

[51] Int. Cl.⁴ ............... B23P 21/00; B23Q 15/00
[52] U.S. Cl. .................................. 29/701; 29/703; 29/709; 29/711; 29/712; 29/720; 29/822; 414/757; 414/744 B; 414/752; 901/7; 901/17; 901/45
[58] Field of Search ............ 29/701, 703, 709, 711, 29/712, 720, 822; 414/744 B, 752, 754; 901/7, 17, 45

[56] References Cited

U.S. PATENT DOCUMENTS

| | | | |
|---|---|---|---|
| 2,494,939 | 1/1950 | Nance et al. | 209/707 |
| 3,418,099 | 12/1968 | Carter et al. | 414/752 X |
| 3,739,909 | 6/1973 | Garland et al. | 209/668 |
| 3,940,908 | 3/1976 | Dazen et al. | 53/497 |
| 3,965,648 | 6/1976 | Tedesco | 53/525 |
| 4,086,522 | 4/1978 | Engelberger et al. | 29/701 X |
| 4,125,577 | 11/1978 | Bezold | 29/422 X |
| 4,228,886 | 10/1980 | Moran | 901/7 X |
| 4,278,046 | 7/1981 | Clarke et al. | 901/7 X |
| 4,282,064 | 8/1981 | Hayashi et al. | 376/426 |
| 4,383,359 | 5/1983 | Suzuki et al. | 29/712 |
| 4,453,303 | 6/1984 | Leddet | 29/701 X |
| 4,561,176 | 12/1985 | Leddet | 29/709 |
| 4,571,149 | 2/1986 | Soroka et al. | 414/750 |
| 4,589,184 | 5/1986 | Asano et al. | 414/225 X |
| 4,589,199 | 5/1986 | Ohtaki et al. | 901/7 X |

*Primary Examiner*—Howard N. Goldberg
*Assistant Examiner*—Ronald S. Wallace
*Attorney, Agent, or Firm*—Thomas R. Trempus

[57] ABSTRACT

The present invention provides a technique as well as a system whereby through the use of industrial automation, windshields and the like can be inserted into a vehicle which is on a continuously moving conveyor line without stopping the vehicle. Thus, the vehicle is in motion on the conveyor during the insertion. The windshield can be automatically centered for robot acquisition through a unique mechanical device; and, multi-sensor information is converted into real-time path modification signals for robot guidance.

9 Claims, 7 Drawing Figures

WINDSHIELD INSERTION SYSTEM FOR A VEHICLE ON A MOVING CONVEYOR APPARATUS

BACKGROUND OF THE INVENTION

1. Field of the Invention

This invention is directed to a system for inserting a component part into a product which is moving through an assembly process. More particularly, this invention provides a robotic system for inserting windshields into a vehicle. The vehicle is in motion on a conveyor during the insertion. The windshield is automatically centered for robot acquisition. Multiple sensor information is converted into real time path modification signals for robot guidance so that the windshield can be inserted into the windshield opening of an automobile which is in a somewhat random orientation on a moving conveyor apparatus.

2. Description of the Prior Art

The general acceptance of industry automation as an essential requirement for improving productivity has increased acceptance level of the robot or industrial manipulator apparatus as a mechanism for achieving automated industrial applications. The acceptance of robots as a useful, industrial "tool" has resulted in a market demand for robotic systems capable of implementing what have heretofore been difficult, dangerous or tedious tasks.

The automotive industry presents exceptional opportunities for the use of robots or industrial manipulators for the purpose of improving productivity and enhancing quality of the finished product. What were once routine tasks are now efficiently and effectively being implemented by robots working side by side with their human worker counterparts. For example, robots are now used to apply adhesives and sealing materials to various component parts of an automobile. Robots are also used to move heavy component parts and weld the various component parts of an automobile together as well as to apply paint to the automobile. Certain tasks, however, have heretofore not lent themselves to automation. One example of such a task is the insertion or decking of windshields into vehicles. Several obvious factors have prohibited the automation of the decking process. A high level of accuracy is necessary in order to place the windshield into the windshield opening of the vehicle. A slight miscalculation during the decking process can result in both damage to the vehicle and destruction of the windshield. Additionally, the existing conveyors which transport the automobile through various work stations are relatively unstable and tend to cause a slight change in the precise orientation of the vehicle mounted thereon. Moreover, typically the nearly complete vehicle into which the windshield is to be inserted is positioned on the conveyor apparatus in such a way as not to permit the exact location of the windshield opening to be consistently known. In other words, there is a certain level of random orientation of the vehicle on the assembly line during the stage in which the windshield is to be inserted. As a result, the decking operation has heretofore been accomplished through the use of two or more workmen engaging a windshield with hand-held lifting equipment and walking across the assembly line so that one worker is along each side of the vehicle and manually inserting the windshield into the vehicle windshield opening. This technique has the advantage of precision windshield placement, while permitting the existing conveyor system to continuously transport the vehicle through the decking station. During this process, workmen on either side of the vehicle walk along side the vehicle as it passes through the windshield insertion station while they insert the windshield into the windshield opening.

In order to effect the automated insertion of a component part into a product, it is necessary to initially know the exact orientation and location of the product. With this information, the orientation of a component part can be established and once acquired by an industrial manipulator, the insertion of the component part into the product can be easily and quickly accomplished. However, when a moving conveyor apparatus is used to transport the product to the work station in which the component insertion is to take place, it has heretofore been necessary to either have precise orientation of the product on the conveyor or to simply stop the conveyor for the length of time necessary for the robot to effect the insertion process. Obviously then, if either the orientation of the product is unknown or if the product is subject to somewhat random moves during the conveyance procedure, the insertion of the component part into that product would be very difficult.

A system has been designed incorporating an industrial manipulator using the Unimation Incorporated VAL II controller with alter port. The alter port was used in conveyor tracking in order to track a car being transported down an assembly line on a first conveyor. The industrial manipulator, tracking with the car, picked up part of a car body and moved it from the first conveyor to a second overhead conveyor. While the car was tracked and picked up by a robot and put on the next conveyor through the use of the alter port, any minor differentiation in the positioning of the car body on the first conveyor with respect to the robot was compensated for by a degree of compliancy in the gripper which was used to pick up the car. This system knew the general location of the car on the conveyor and depended upon the compliance of the gripper to engage the car for transport to the second conveyor. This system utilized strictly the tracking of the conveyor with no attempt to identify the exact location of the car disposed thereupon.

It is an object of this invention to provide a system which is capable of tracking a moving object in all coordinate systems. The component is moving up and down and it is shifting from side to side due to the motion of the conveyor apparatus used to transport the car body.

It is another object of the present invention to provide a technique whereby a component part can be inserted into a product having a relatively unknown or unstable orientation on a moving conveyor apparatus.

It is a further object of the present invention to provide an automated system for the insertion of a windshield into a moving vehicle.

It is yet another object of the present invention to provide an automated system wherein a multi-sensor processor provides simultaneous sensor information for conversion into real time path modification signals for robot guidance.

It is still another object of the present invention to provide a windshield insertion system for a moving vehicle which can readily be incorporated with existing conveyor systems in automotive plants.

It is yet again another object of this invention to provide in combination with existing conveyors which continuously transport vehicles without stopping at the insertion stations, a windshield insertion system for inserting windshields into a continuously moving vehicle on a conveyor line.

It is another object of this invention to provide a system which can be used to insert various component parts into a product apparatus such as, for example, back lights and quarter windows, as well as other assembly line parts, into an automobile being transported on a moving conveyor line.

It is another object of this invention to provide a system which is not sensor technology dependent and which can function with various types of robots or automated systems and is insensitive to car or product position and orientation due to of the extensive use of sensors.

SUMMARY OF THE INVENTION

The present invention provides a technique as well as a system whereby through the use of industrial automation, windshields and the like can be inserted into a vehicle which is on a continuously moving conveyor line without stopping the conveyor line. Thus, the vehicle is in motion as it passes on the conveyor through a work station during the insertion process. The windshield can be automatically centered for robot acquisition through a unique mechanical device; and, multi-sensor information is converted into real-time path modification signals for robot guidance.

More particularly, the present invention is a system for inserting a windshield into the windshield opening of an automobile which is disposed in a somewhat random orientation on a conveyance means for the transportation of the automobile through one or more assembly stations. The invention provides an industrial manipulator means which defines a work envelope through which the conveyance means transports the automobile. This industrial manipulator includes a control means for the programmed movement of the industrial manipulator through a predetermined routine for the acquisition and delivery of a windshield from a first location to a predetermined location proximate the area of insertion of that windshield. The industrial manipulator controller means includes the capability of accepting real-time data for the modification of the predetermined routine. The industrial manipulator includes an end effector which retrieves a windshield from the first windshield depository location and is capable of effecting the insertion of the retrieved windshield into the windshield opening. This industrial manipulator is capable of movements through coordinates defined by X, Y, Z axes and rotations about these axes in the work envelope. The system further includes means for generating a first signal indicating that an automobile has entered the work envelope of the industrial manipulator. Means are in communication with the conveyance system for generating a second signal which is indicative of the travel of the conveyance means through the work envelope. This second means is in communication with a central processing unit and the robot controller is inevitably responsive to the central processing unit whereby the travel of the automobile in the X axis is monitored and movement of the industrial manipulator along the X axis of the envelope is coordinated with the movement of the conveyor means through the work envelope. A third means for generating a third signal indicative of at least the gross position of the automobile with respect to the Y axis of the work envelope is provided in a communication with the central processing unit. Accordingly, this third means is responsive to the location of the automobile with respect to the Y axis of the work envelope so that movement and positioning of the industrial manipulator along the Y axis is coordinated. A fourth means for generating a fourth signal indicative of at least the gross position of the automobile with respect to the Z axis of the work envelope is also provided. The central processing unit is responsive to this fourth signal and in combination with the aforementioned first, second and third signals provides an output to the alter port of a robot controller to affect the final trajectory of the industrial manipulator. This fourth signal identifies the location of the automobile with respect to the Z axis of the work envelope. Finally, sensor means are operatively associated with the end effector of the industrial manipulator for finally, accurately locating the windshield opening for the insertion of the windshield thereinto. This sensor means preferably comprises robot mounted cameras which accurately locate the car window opening and the vision controller communicates data to the robot through the multi-sensor processor for the insertion of the windshield into the car window opening.

BRIEF DESCRIPTION OF THE DRAWINGS

The above as well as other features and advantages of the present invention can be readily appreciated through consideration of the detailed description of the invention in conjunction with the accompanying drawings in which.

DETAILED DESCRIPTION OF THE INVENTION

The present invention teaches a windshield insertion system for a moving vehicle. While the specific application of the concepts disclosed herein are dedicated to the insertion or decking of a windshield into the windshield opening in an automobile on an assembly line, it should be readily appreciated that these concepts an be adapted for use in any type of assembly process in which a component part is being inserted into a product and that product is being conveyed through an assembly area by means of a conveyor or the like. Thus, through the use of the concepts of this invention and the specific elements of the system described herein, a product being conveyed on an assembly in a somewhat random orientation and subjected to changes in orientation due to the nature of the assembly line conveyor itself can be the object for the automated insertion of a component part thereinto.

Figure 1:
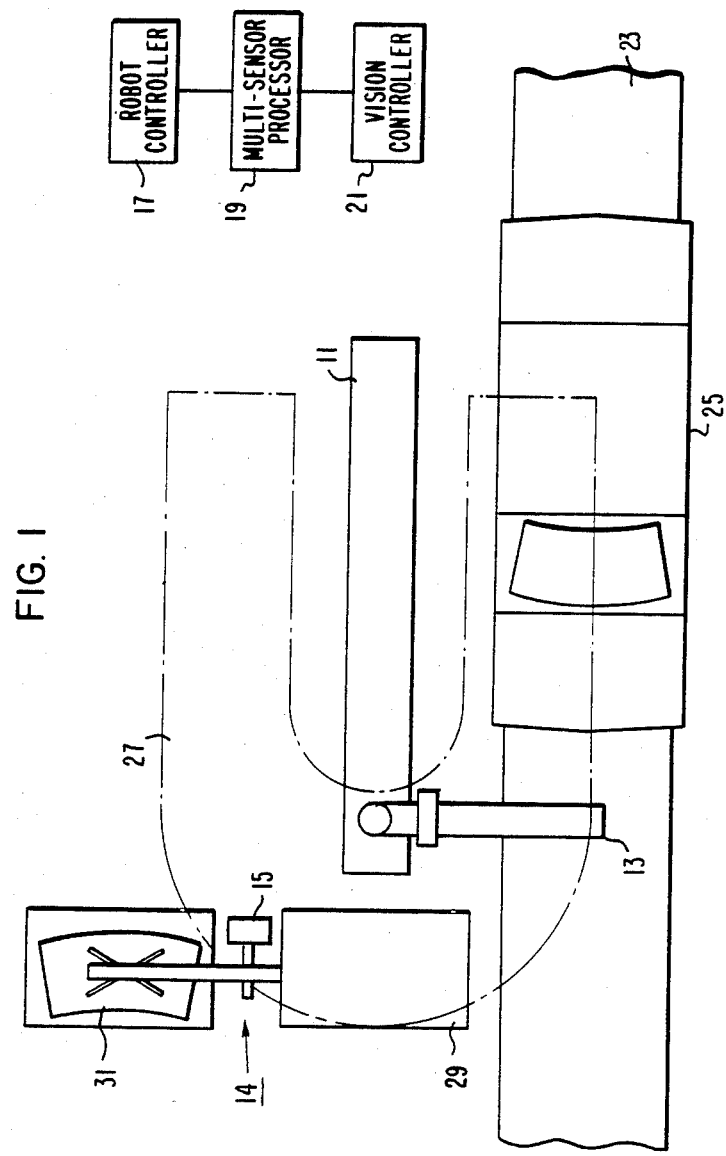
FIG. 1 is a schematic plan view of a windshield insertion system for a moving vehicle all according to the teachings of this invention.

A rather schematic plan view of a windshield insertion system station can be seen in FIG. 1 and is generally indicated by the reference character 11 and includes several major components. Among these components are the industrial manipulator 13, a centering mechanism 14, a robot controller 17, a multi-sensor processor 19 and a vision controller 21. Each of these individual elements will be described in detail hereinafter. The schematic representation also illustrates a conveyor means 23 adjacent the industrial manipulator 13. The conveyance means is typically an existing conveyor within the automotive plant. One of the unique advantages of the present invention resides in the fact that conveyor belt modifications are not required. Accordingly, with this windshield insertion system, the vehicle itself does not have to be stopped while the windshield is being inserted. In other words, the conveyor 23 continuously transports vehicles 25 into and through the work envelope 27 of the industrial manipulator 13. It should be appreciated that the vehicle 25 which is deposited on the conveyor 23 at a previous work station is not situated precisely on that conveyor. In other words, the actual orientation of a vehicle with respect to the conveyor may vary along coordinates defined by the X, Y or Z axes of the work envelope 27 of the industrial manipulator. Because of this somewhat random orientation, it has heretofore been impossible to affect the decking operation on a vehicle through the use of a robot without first stopping the conveyor and insuring that the vehicle is positioned according to predetermined requirements as established by the program of the robot being used to effect the decking operation.

A system incorporating the teachings of this invention has been designed and constructed with a Unimation 6000 Series gantry robot. U.S. patent Ser. No. 4,571,149 entitled "General Purpose Orthogonal Axes Manipulator System" by Daniel P. Soroka et al., U.S. Pat. No. 4,571,149, issued Feb. 18, 1986, which is assigned to the assignee of the present invention, discloses this overhead gantry-style robot. This robot is characterized by a large rectangular working envelope which extends to both sides and both ends of the gantry. This robot permits programming in Cartesian coordinates as contrasted with the more complicated polar coordinates. This gantry robot design provides a rigid manipulator that can support machine tool-type interpolation moves with high accuracy and repeatability while permitting robotic-type velocity and dexterity.

Figure 2:
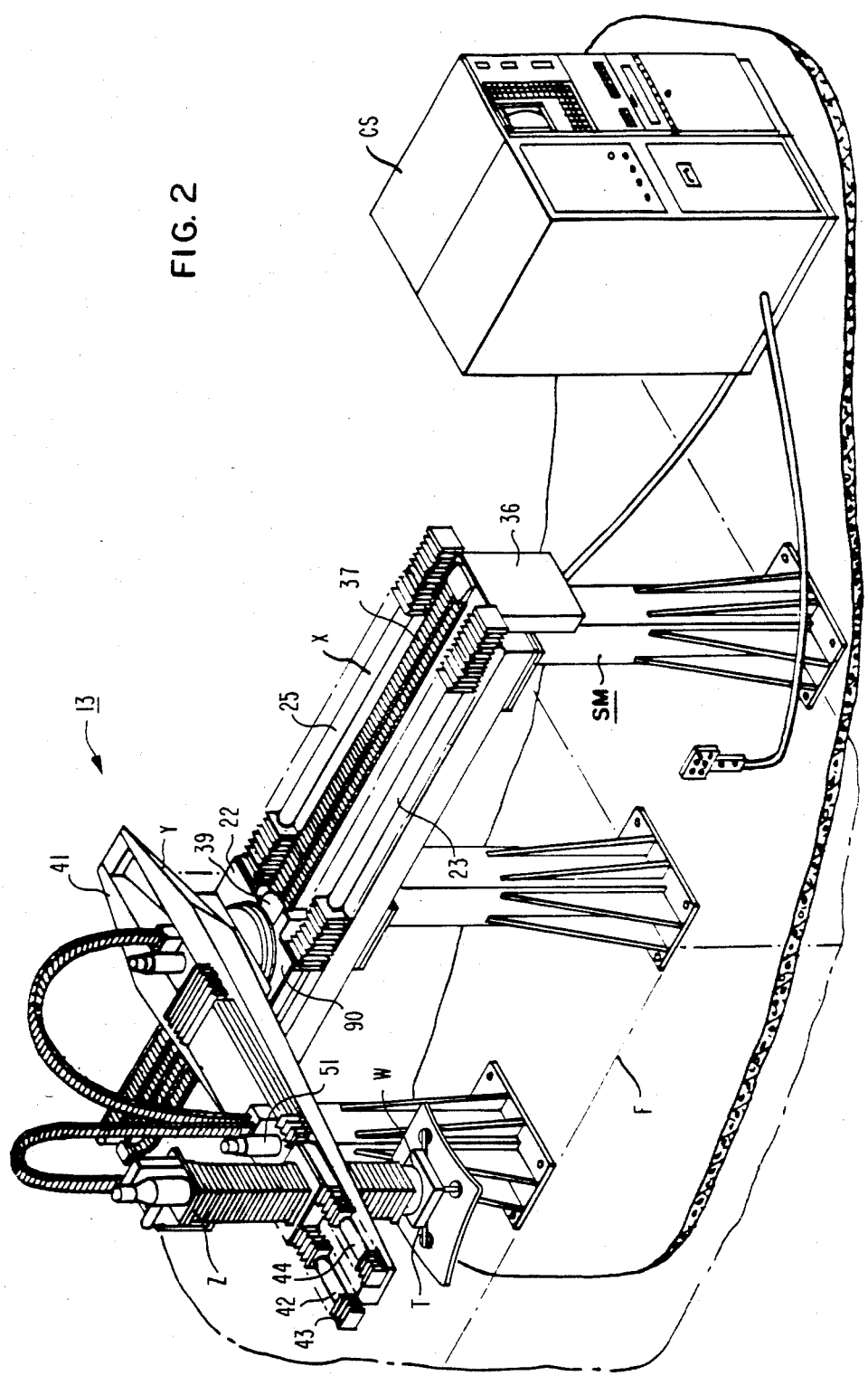
FIG. 2 is an isometric view of an orthogonal axis manipulator system which is used in the preferred embodiment of this invention.

Turning now to FIG. 2, there is pictorially illustrated a Unimate 6000 Series industrial manipulator 13 comprising three orthogonal axes assemblies consisting of the X axes assembly, the Y axes assembly, and Z axes assembly. A multi-axis rotary wrist mechanism W is mechanically secured to the Z axes assembly to accommodate an end effector T which is particularly designed for use in acquiring and inserting a windshield. The preferred wrist for use in the present system is described in U.S. patent application Ser. No. 605,495, filed Apr. 30, 1984, now abandoned, which is entitled "An Improved Robotic Wrist" and which is assigned to the assignee of the present invention and incorporated herein by reference. This modular robotic wrist system for industrial manipulators comprises a mounting bracket and an A axis module providing rotational movement about a first axis and a B axis module to provide either rotational movement which can be either independent or correlated with the first axes movement about a second axis. A tool mounting flange for use with the B axis module provides rotational movement of an end effector about the second axis. Each modular unit has a rotating member driven by a high speed, low torque DC motor coupled to a harmonic drive unit and may have a position/signal feedback mechanism.

The operative combination of the X, Y, and Z axes assembly is supported in a gantry-type configuration by the vertical support members SM which are secured to the floor F of the work facility. A robot control system CS is provided for use in combination with the aforedescribed Unimation Series 6000 robot. The ideal control system for this invention is the Unimation Incorporated VAL II which uses a high level, highly structured computer language based on intuitive English commands which are easy to learn, use and execute. Most importantly, however, the VAL II control system provides an alter port. The alter port on the robot controller permits the introduction of incremental changes to the position of the robot. With the alter port, a modification to the program trajectory of the robot can be introduced every 28 milliseconds. Data which is generated by a multiplicity of sensors which will be discussed below is integrated by the multi-sensor processor 19 which provides a signal to the alter port of the VAL II controller every 28 milliseconds. Thus, the system of this invention incorporates real time tracking and positioning of the industrial manipulator through the integration of sensor obtained information.

The orthogonal axis machine tool-type configuration of the X, Y and Z axis assemblies elevated in the gantry configuration results in an optimized working envelope corresponding to a generally rectangular volume work zone. This gantry configuration of the orthogonal axis manipulator 13 significantly reduces the number of wrist articulations required to implement the desired work process and further reduces requirements for auxiliary devices. Pulse width modulated drive for the closed loop DC servo motor arrangements of each axis assembly is provided through the use of conventional drive circuitry located in the drive cabinet DS. The direct coupled DC servo motor arrangement includes a motor tachometer package and a resolver. The tachometer provides speed feedback information to the control console CS while the resolver supplies the control console CS with position feedback information directly from the drive motor. This provides a highly stable servo response.

The X axis assembly consists of a closed cell type of construction which minimizes the torsional deflection of the X axis carriage 22 as it travels along the X axis guidance system, thereby providing desired system accuracy and repeatability. The dual rail way system which is supported by the members SM mounted on factory floor F, further assures a smooth, low friction travel of the X axis carriage 22 in response to the closed loop DC servo control. The X axis carriage 22 is coupled to the guide rails 23 and 25 by the linear bearings which are preloaded and sealed in housings to protect the bearings from the dirt.

The mechanical drive for the X axis assembly is a rack and pinion mechanism which is direct coupled to the DC servo motor/tachometer package 26. The direct coupling of the drive motors of the axis assemblies through low backlash drive elements minimizes lost motion.

The cabling for the manipulator system 13 extends from the junction box 36 at the end of the X axis structure and continues through the flexible cable carrier 37 to a junction box 39 on the movable axis carriage 22.

The Y axis assembly functions as an arm extending perpendicularly from the X axis assembly 20. It includes a Y axis support member 41 and a double rail way arrangement comprising guide rails 42 and 44 to minimize the stress and rotational deflections during the Y axis travel of the Y axis carriage 46 as well as during the positioning of the Z axis assembly within the work envelope 27. The guide rails 42 and 44 are protected by bellows covers 43. The DC servo drive for the Y axis assembly which is similar to that for the X axis assembly, includes a drive motor/tachometer package 51, gear box resolver package and a hardware limit switch package which provides end of travel and home location limits as backups to the storage software limit switches.

The vertical Z axis assembly employs a ball-screw mechanical mechanism.

A rotary index unit 90 increases the working envelope of the manipulator system 13. The unit 90 is located at the interface of the X axis carriage 22 and the Y axis assembly to enable the Y axis assembly to be horizontally rotated 180° at the end of travel of the X axis carriage since the return travel of the X axis carriage 22 permits servicing of a second rectangular volume work zone on the opposite side of the X axis assembly as shown in FIGS. 1 and 2. This unique feature of the Unimate Series 6000 gantry robot permits the Y axis arm to position the Z axis disposed manipulator on first one side of the gantry support structure SM for the acquisition of a windshield and then to convey the acquired windshield depending from the Y arm to the opposite side of the gantry support structure SM in order to position that windshield for insertion into the windshield opening of the vehicle.

Figure 3:
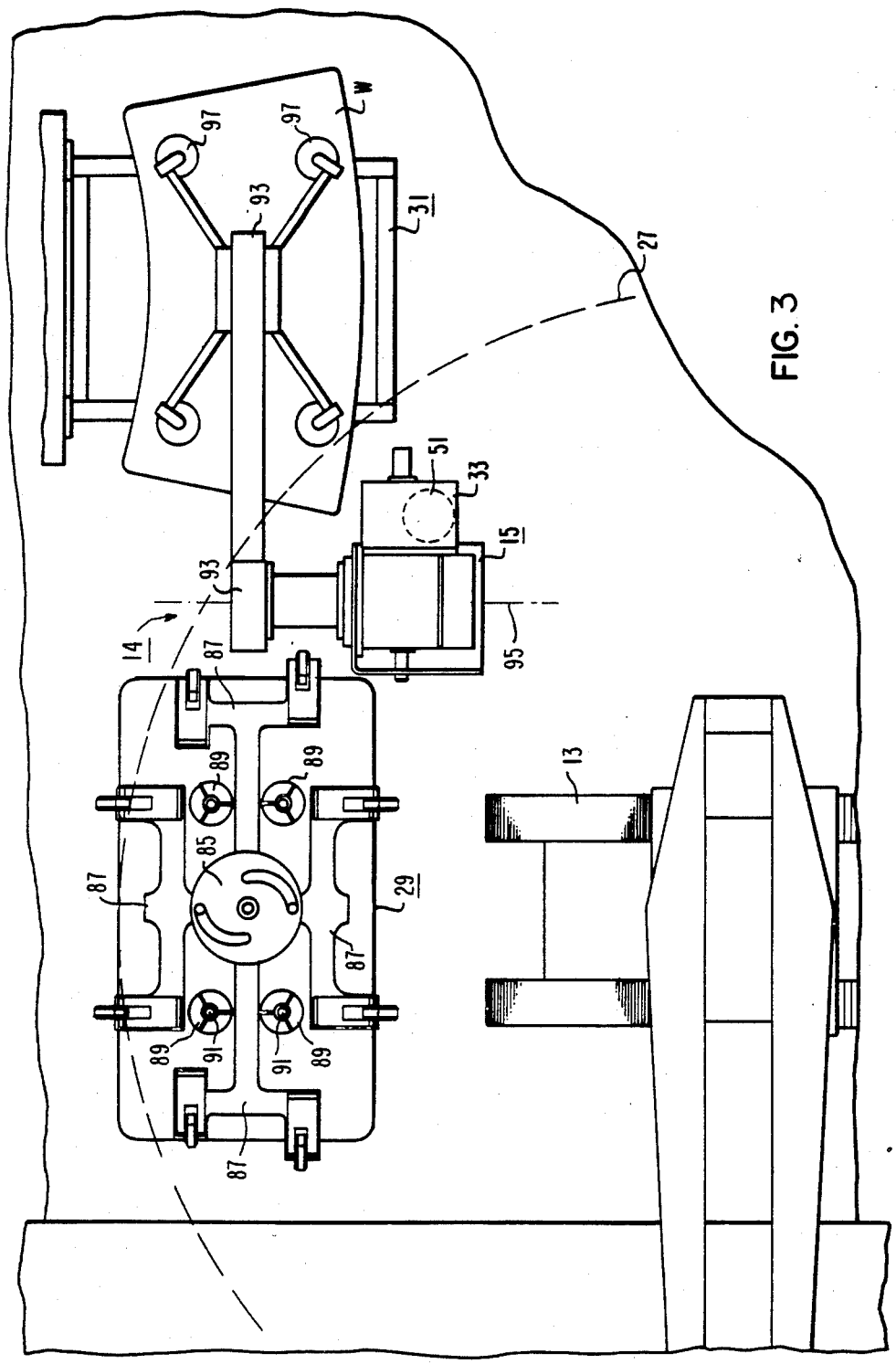
FIG. 3 is an isometric view of a flip-over and center apparatus which presents and orients the windshield in the preferred embodiment of this invention.

Considering both FIGS. 1 and 3, a centering mechanism indicated at 14 is shown in plan view in FIG. 3 and schematically in FIG. 1. The centering mechanism actually includes a centering device 29 and a flip-over mechanism 15 for transferring the windshield W from a transfer station 31 to the centering device 29. Typically, the transfer station will provide a receptacle wherein one or more windshields is initially delivered to the windshield insertion station by means of a conveyor or through the use of another industrial manipulator or through manual manipulation of the windshield. The centering device includes a plurality of cam-actuated 85 support arms 87 and four windshield support mounts 89 which provide a rotating ball support 91 on which the windshield is deposited. With the windshield W so deposited, the cam-actuated arms 87 engage the four sides of the windshield and urge the windshield into a centered position with respect to the centering device 29. The flip-over mechanism 15 includes a flip-over arm 93 which is actuated by a motor contained in the flip-over mechanism and rotated about an axis 95. At the cantilevered portion of the arm 93, a windshield engaging mechanism including four vacuum-actuated end effectors 97 acquires a windshield and retrieves that windshield from the transfer station 85. The rotation of the flip-over arm 93 about the axis 95 places the windshield in a position for acquisition by the end effectors of the 6000 series industrial manipulator. The flip-over arm having transferred the windshield from the transfer station 31 to the centering device 29 remains disposed below the windshield until the windshield is actually acquired by the 6000 series robot. With the windshield resting on the rotating supports 91 of the support mounts 89, the cam-actuated arms 87 eventually engage all four sides of the windshield and urge the windshield into a preestablished centered position. Appropriate sensor means can be provided on the centering device for determining whether or not the windshield has been properly centered and if any damage has been done to the windshield during the flip-over transfer. Once the windshield has been acquired by the Series 6000 robot, and another windshield delivered to the transfer station 31, the flip-over arm can be rotated back from the centering device to the transfer station. A more detailed description of the centering device, the flip-over mechanism and the transfer station can be had through a consideration of co-pending patent application Ser. No. 795,686, filed Nov. 6, 1985, entitled "Robotic Part Presentation Station" by R. S. Antoszewski, which is assigned to the assignee of the present invention.

Figure 4:
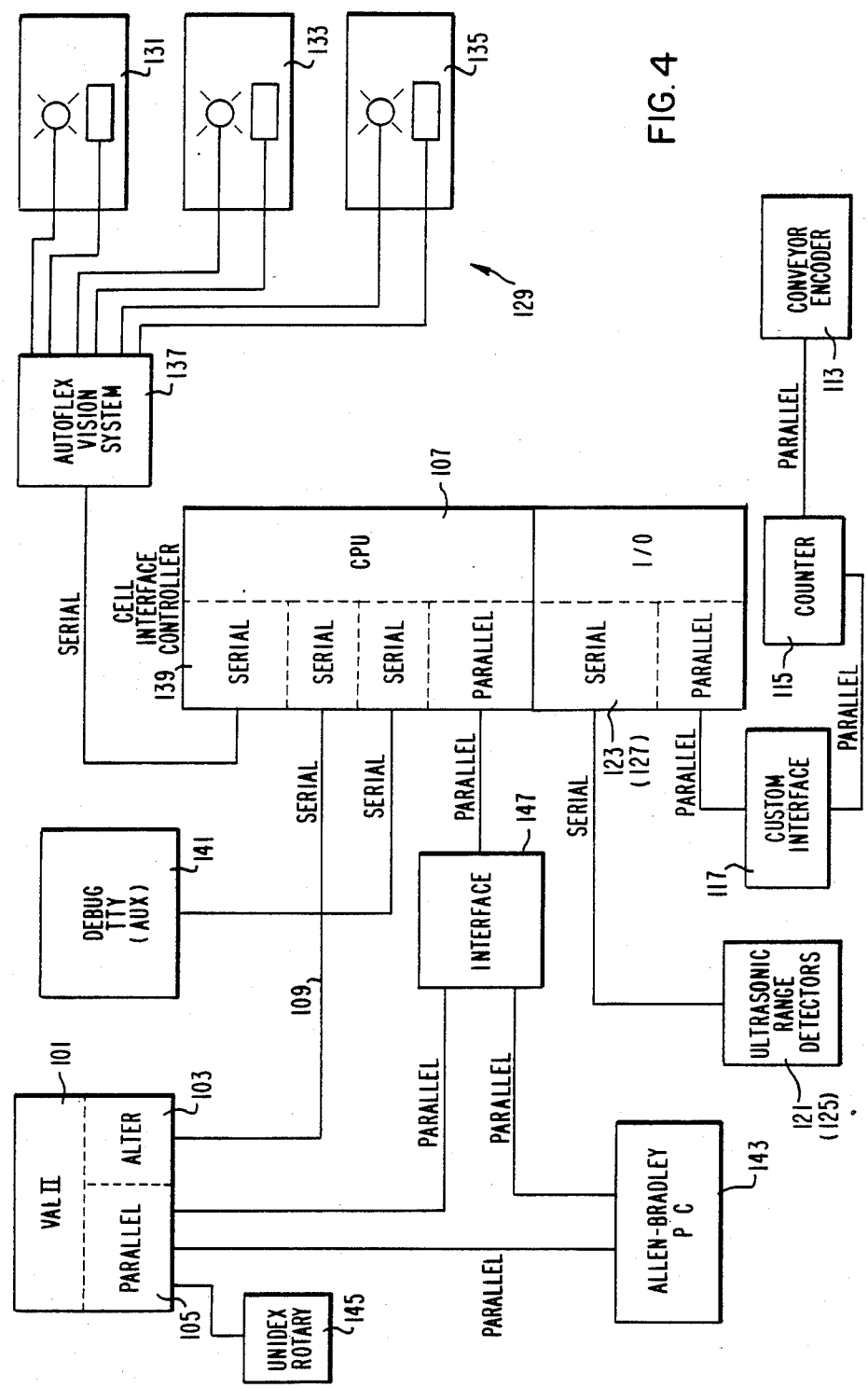
FIG. 4 is a block diagram representing the system architecture of the present invention.

Considering FIG. 4, there is shown a block diagram representing the VAL II controller, the various sensor means by which information is collected and the central processing unit whereby a simultaneous sensor information for conversion into real-time path modification signals for robot guidance is effected. The VAL II controller is designated by block 101 and shows the alter port at 103 as well as the parallel input ports 105. The cell interface controller at 107 is a central processing unit which receives multi-sensor inputs to provide simultaneous sensor information for conversion into real time path modification signals for robot guidance through the line 109 to the alter port 103 of the VAL II controller. The A-post trigger 111 is a means for generating a first signal indicating that the automobile has entered the work envelope of the industrial manipulator. The activation of the A-post trigger indicates that an automobile on the conveyor has reached a certain point within the work envelope and that the tracking of the automobile should be initiated. A second means, a conveyor encoder 113 is in communication with the central processing unit 107 through counter 115 and custom interface 117 to parallel port 119. The encoder 113 is in communication with the conveyance apparatus and generates a second signal indicative of the travel of that conveyance means through the work envelope. This signal establishes the travel distance of the conveyor through the work envelope after triggering of the A-post. The second signal is indicative therefore of the travel of the automobile in the X axis of the work envelope. A third signal is generated by a third means, the ultrasonic range detectors 121 which is indicative of at least the gross position of the automobile on the conveyor with respect to the Y axis of the work envelope. This information is conveyed to a serial port 123 of the central processing unit 107. A fourth means comprising another set of ultrasonic range detectors 125 generates a fourth signal indicative of at least the gross position of the automobile on the conveyor with respect to the Z axis of the work envelope. This information is conveyed to the serial port 127 of the cell interface controller 107. In the actual embodiment of the windshield insertion system of this invention B-SCAN ultrasonic proximity sensors from Amerace Corporation have been successfully employed. Sensor means are also operatively associated with the end effector mounted on the Unimate Series 6000. In the preferred embodiment a vision system generally indicated at 129 incorporates three cameras 131, 133 and 135 with an Autoflex Inc. vision system 137 to provide a final indication of the accurate location and placement of the windshield opening for the insertion of the windshield thereinto. These sensor means generate a fifth signal which is provided to the serial input 138 of the cell interface controller 107.

Debug/tty Auxiliary 141 is the operator's console and diagnostic terminal. It provides a mechanism for the operator to monitor the operation of the system. However, it is not required for normal operation. Its secondary purpose is for use as a diagnostic and debug control console. Through the terminal a service person has the ability to monitor and control the operation of sensor systems. By manipulating certain parameters and/or monitoring special status flags problems with the system can be easily and quickly identified and corrected. The third and final use of this device is as an aide in initial start-up of the system. Certain parameters which describe important characteristics of the work cell and which are unique to each work cell, must be entered into the sensor controller. This is done via this terminal by involving and using the setup mode. Once accomplished, the parameters are stored in non-volatile RAM memory. The Allen-Bradley PLC 143 is a device which is used by the operator to monitor the activity of the entire decking operation. This invention provides signals to the PLC and monitors signals from the PLC. The signals are used to report status and to coordinate the operation of the entire decking operation. The Unidex Rotary 145 controls the rotation of the Y axis about the X axis. It receives commands from the VAL II controller concerning when and where to place the Y axis. It then selects the appropriate program to execute and signals the robot controller when the task is complete. The interface 147 converts the different voltage and current levels of the parallel I/O signals into a voltage and current compatible to the cell interface controller 107 which provides a multi-sensor input processor for the simultaneous processing of sensor information for conversion into real-time path modification signals for robot guidance via the alter port of the VAL II controller 101.

Figure 5:
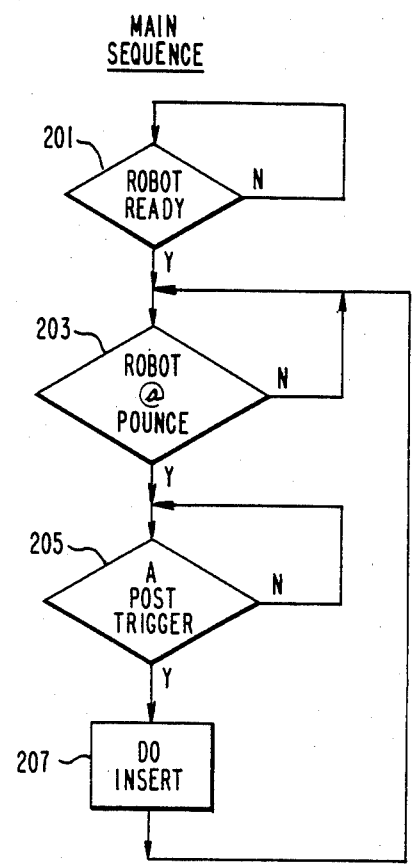
FIG. 5 is a flow diagram illustrating the several steps involved in the main sequence of the operation of the windshield insertion system of this invention.
Figure 6:
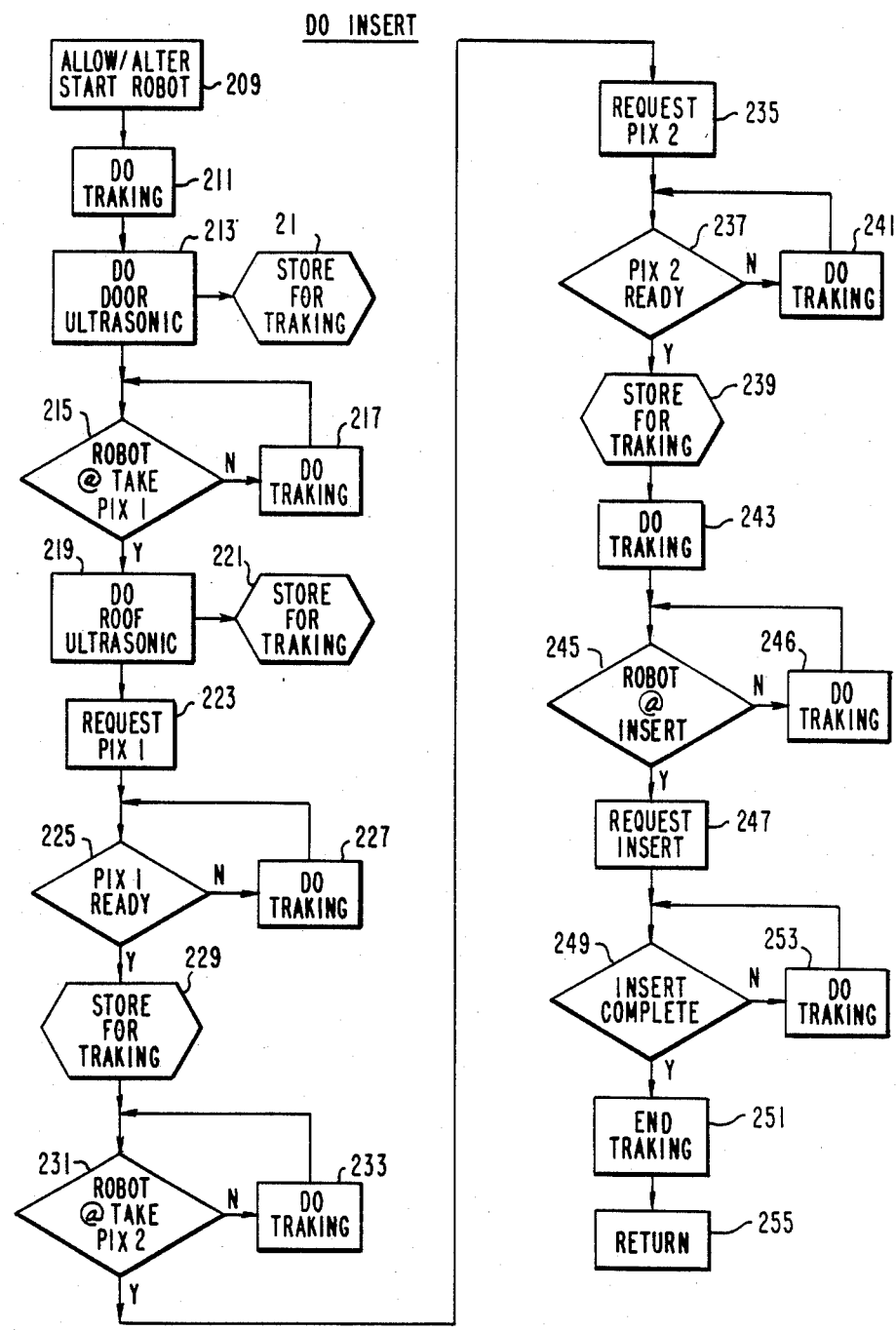
FIG. 6 is a flow diagram representing the "do insert" procedures all according to this invention.
Figure 7:
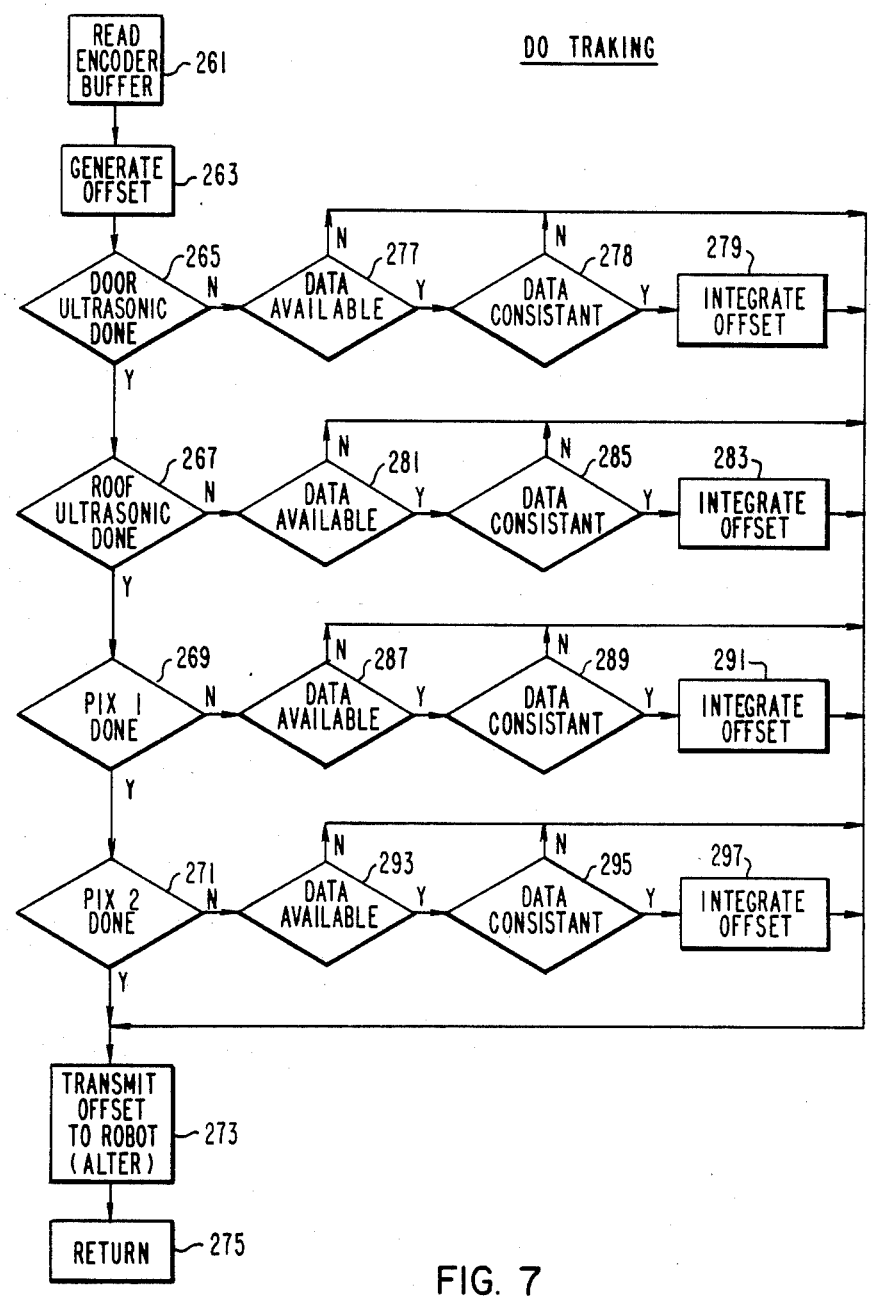
FIG. 7 is a flow diagram representing to "do tracking" process all according to the teachings of this invention.

Turning now to FIGS. 5, 6 and 7, a series of flow diagrams represent the program by which the windshield is first acquired and then positioned for insertion into an automobile on a moving conveyor line. In FIG. 5, the main sequence is shown in flow diagram. It is initially determined if the robot is ready for the insertion operation 201. If the robot is not ready, the insertion process will proceed no further until an indication signal is received at the controller. 'Robot ready' indicates that a windshield has been acquired by the end effector of the Series 6000 robot and that the robot is ready to position the windshield in the 'pounce position' 203. The 'pounce position' is the position which the robot takes over the assembly line with the windshield in the gripper ready for the car to pass below it so that the windshield can be inserted thereinto. Again, the process waits in that loop until the robot is at the 'pounce position' 203. The next decision point is the 'A-post trigger' 205. When the A-post trigger is activated, the car has reached a predetermined point on the conveyor and the tracking process is initiated. Thus, through the tracking process, the robot ultimately moves to the sensor position whereby the vision means can acquire the opening in the automobile for the windshield. Once the robot is in the 'pounce position' 203 and the A-post trigger has been activated 205, the subroutine "do insert" 207 is initiated. Upon completion of the "do insert" subroutine the program recycles to the 'robot pounce' 203.

Turning now to FIG. 6, the "do insert" subroutine 207 shown in the diagram on FIG. 5 is described in detail. The first event in the "do insert" subroutine is the establishing of communications with the robot on the alter port of the VAL II controller shown in FIG. 4. This event is shown in block 209. The alter port on the robot allows the incremental change to the position of the robot with every VAL "tic". A VAL "tic" occurs every 28 milliseconds. The 'allow alter start robot' 209 initiates the robot's movement toward the first position at which it will take a picture. At the same time, the subroutine "do tracking" 211 is initiated in which the cars movement on the assembly line is tracked. This subroutine will be described in detail in conjunction with FIG. 7. The second sensor means or door ultrasonic which is located near the A-post trigger is initiated. 'Door ultrasonic' at 213 provides a gross position of the car with respect to the robot's Y coordinate. This information is taken and stored at 215 for future use in the tracking operation. Next, there is a decision point in which the robot has reached the picture taking point at 215. The answer to this question initially is always going to be no. Since if the robot has not reached the 'take picture one' position, the routine goes back to "do tracking" at 217. At that time, the door ultrasonic is factored in so that a gross move to a position wherein the robot end effector is within the bounds of the vision system is made immediately. Upon effectively completing the 'take picture one' step 215 it is known that the robot end effector is a predetermined distance from the automobile. Once 'picture one' 215 is completed, the fourth sensing means is activated at the 'do roof ultrasonic' 219. This fourth sensing means or roof ultrasonic provides a gross indication of where the automobile lies with respect to the Z plane of the robot. That is to say, how high the automobile is off the assembly line. This information is then stored at 221 for later use in tracking and at the same time the request that picture one be taken as initiated at 223. The program remains in that loop until it is established that the vision system has provided the first picture for processing in the central processing unit. During operations, the first picture takes roughly 4 to 5 seconds. Thus, the tracking is continued while awaiting picture one at 225. Once the signal has been generated from the vision processor that the information is available, the information is passed to the central processing unit and is also stored for tracking at 229. The robot is then moved to a corrected position to 'take picture two' at 231. 'Take picture two' at 231 is completely dependent upon the information that was gathered by the two ultrasonic tests at 213 and 223 and the first picture that was taken by the vision system at 225. This information is now stored in the tracking system and the tracking system is positioning the robot to what would appear to be the insert position. The 'take picture two' at 231 step provides an added measure of safety. If one could assume 100% vision system reliability, one could move directly from the 'picture one ready' 225 to the insertion of the windshield. However, the 'take picture two' 231 insures that the automobile did not move with respect to the assembly line due to the motion of the assembly line. The same procedure occurs with the request of picture two that occurred with the request of picture one in that the do tracking subroutine continues to occur. With the information from the second picture 231 as well as the "do tracking" subroutine at 233, if the car has drifted slightly or moved slightly, small incremental changes can be initiated in the position of the robot so that the windshield is properly aligned for insertion. Thus, once the request for picture two at 235 is completed and it is established that picture two is ready at 237, the information is stored at 239 for tracking. As indicated above, if picture two is not ready, the "do tracking subroutine" 241 continues.

At this point, the program requests that the robot effect insertion of the windshield at 245.

Having positioned the robot through the processing of the multi-sensor information by the central processing unit through the alter port of the VAL II controller, a decision point is reached concerning the insertion of the windshield. If it is determined that the windshield can be inserted, the program moves to block 247 in which 'request insert' is initiated. 'Request insert' 247 is a subroutine which is resident within the robot and is a fixed move from the predetermined position of the robot with respect to the automobile which is established through the tracking process whereby the windshield can be directly inserted into the windshield frame of the automobile. After this fixed move is completed, the sensors in the gripper provide feedback to the robot indicating whether or not the insertion is completed at 249. If the insertion is completed as established through feedback from sensors located in the end effector of the robot gripper, the command is given at 251 to untracking. If the insertion is not completed, the command to do tracking is provided as at 253. If the windshield has been successfully completed and the end tracking command has been initiated at 251, the next command at 255, the robot program is then returned to the main sequence 255.

The subroutine "do tracking" is shown in FIG. 7. In this subroutine, block 261 indicates the program command to read the encoder buffer. The encoder is on the conveyor apparatus itself and is counting in terms of incremental pulses the rate of travel of the conveyor along the X axis of the industrial manipulator. The encoder indicates how far the conveyor has moved since the A-post was triggered. In the do tracking subroutine, the encoder buffer is read to see how far the conveyor has moved during any given time period. From that, an offset can be generated which indicates that the robot has to be repositioned with respect to the X axis in order to maintain a fixed distance between the end effector and the automobile. This offset is represented at block 263. At the same time, other data is being reviewed such as whether or not the door ultrasonic at 265 has been completed. If the door ultrasonic has been completed, the next decision point is whether the roof ultrasonic at 267 has been completed. Assuming both the door ultrasonic and roof ultrasonic have been done, the next decision point is whether picture one has been completed at 269. Assuming picture one has been completed, the program establishes whether the second picture has been taken at 271. If both the roof and door ultrasonic as well as picture one and picture two have been completed, the offset is transmitted to the robot alter port at 273. Assuming that the offset is successfully transmitted to the robot alter port at 273, the subroutine returns to the step indicated in the tracking program shown in FIG. 6 at block 275. From time to time situations will arise in which one of the sensor means has not provided the appropriate sensor signal. For example, the full ultrasonic at 265 may not have been completed at which point another decision will be raised as to whether or not data is available at 277. If the data is available, the data will be used to integrate an offset at 279. If the data is not available, the last offset will be transmitted at block 273. If the data is available, the data will be analyzed to determine whether or not it is consistent and within a predetermined parameter at 279. Similarly, if this roof ultrasonic at 277 is not done, the decision point as to whether or not data available will be addressed at 281. If the data is not present, the previously stored tracking information will be evaluated and transmitted to the alter port. If the data is available, the offset will be integrated at 283 and transmitted to the alter port. Here again, at 285, a test is made to determine whether or not the data is consistent within the predetermined parameters. At block 269 if picture one is not done, it is determined whether or not data is available at block 287. If the data is not available, the offset information is transmitted directly to the robot through the alter port. Here again, if the data is available, it is established whether or not at 289 that data is consistent with known parameters. If it turns that that data is also consistent with the known parameters, the program integrates and offset at 291 for transmission to the alter port of the robot controller. Finally, in reviewing picture two, if picture two is not done, it is established whether or not data is available at 293. Again, if data is available, it is established as to whether or not that data is consistent with known parameters at 295 and if it falls within known parameters, an offset is integrated at 297. This offset is then transmitted to the robot alter port at block 273. It is of course possible to include within this program the option to abort the insertion process should any of the sensors indicate that the windshield being supported by the end effector is grossly out of position with respect to the moving automobile. The robot would then return to the pounce position and await the next A-post trigger signal indicating that a automobile on the assembly line has entered the work envelope of the robot.

It should be appreciated that when offset information is transmitted to the robot through the alter port, the robot is only capable of a maximum degree of incremental change per any time period. The robot can only move so far in the 28 milliseconds between inputs to the alter port. Accordingly, the tracking information is stored as at block 221 and that information is continually provided to the robot controller until such time as the incremental changes in the robot's position have properly aligned the end effector with the predetermined position prior to windwhield insertion.

What has been described is a system comprising a plurality of sensors and an industrial manipulator capable of the insertion of a component into a product traversing the work envelope of the robot on a conveyor line or the like. The product being transported on the conveyor line is being tracked in the X, Y and Z coordinate systems of the industrial manipulator. In other words, a moving object is being tracked in all dimensions.

What is claimed is:

1. A work station for inserting a windshield into the windshield opening of an automobile which is disposed in a somewhat random orientation on a conveyance means for continuous transportation through one or more work stations comprising:

an industrial manipulator means defining a work envelope through which the conveyance means transports the automobile and within which envelope said industrial manipulator is capable of movement through coordinates defined by X, Y and Z axes and rotation about said axes, said industrial manipulator including controller means programmed for movement through a predetermined routine for the retrieval and delivery of the windshield from a storage location to a first predetermined location within the work envelope, said controller means including means for introducing real-time incremental changes thereto, said industrial manipulator further including end effector means for acquiring the windshield from the storage location and inserting the acquired windshield into the windshield opening of the automobile;

first means for generating a first signal indicating that the automobile on the conveyance means has entered the work envelope of said industrial manipulator;

second means in communication with the robot controller for generating a second signal representative of the travel of said conveyance means through the work envelope, said robot controller being responsive to said second signal whereby the travel of the automobile relative to the X axis is monitored and movement of the industrial manipulator along the X axis of the envelope is coordinated;

third means for generating a third signal indicative of at least the gross position of the automobile with respect to the Y axis of the work envelope, said robot controller being responsive to said third signal whereby the location of the automobile with respect to the Y axis is monitored and positioning of the industrial manipulator along the Y axis is coordinated;

fourth means for generating a fourth signal indicative of at least the gross position of the automobile with respect to the Z axis of the work envelope, said robot control being responsive to said fourth signal wherein the location of the automobile with respect to the Z axis is monitored and positioning of the industrial manipulator along the Z axis is coordinated thereby;

fifth means operatively associated with the end effector of said industrial manipulator for accurately locating the windshield opening for the insertion of the windshield thereinto, said fifth means generating a fifth signal; and computer means responsive to at least said second, third, fourth and fifth signals and programmed to provide an input to said controller means including means for introducing real time incremental changes thereto, wherein said controller means effects the positioning of said industrial manipulator from said first predetermined location within the work envelope to a second location within the work envelope, said second location being a predetermined position of said industrial manipulator with respect to the automobile as a result of said second, third, fourth and fifth signals and which positions the acquired windshield in a predetermined spaced relationship with respect to the windshield opening regardless of the orientation of the automobile, said predetermined relationship being such that said industrial manipulator with the acquired windshield is spaced in a non-contact relationship with the windshield opening and the automobile wherein insertion of the windshield is effected by said controller means programmed for movement through a predetermined routine between said second location and the windshield opening of the automobile.

2. The work station for inserting a windshield into the windshield opening of an automobile according to claim 1 wherein the third means for generating a third signal indicative of at least the gross position of the automobile with respect to the Y axis of the work envelope is an ultrasonic sensor means.

3. The work station for inserting a windshield into the windshield opening of an automobile according to claim 1 wherein the fourth means for generating a fourth signal indicative of at least the gross position of the automobile with respect to the Z axis of the work envelope is an ultrasonic sensor means.

4. The work station for inserting a windshield into the windshield opening of an automobile according to claim 1 wherein the fifth means operatively associated with the end effector of the industrial manipulator for locating the windshield opening of the automobile comprises a vision system including cameras.

5. A work station for inserting a component part into an apparatus which is disposed in a somewhat random orientation on a conveyance means for continuous transportation through one or more work stations comprising:

an industrial manipulator means defining a work envelope through which the conveyance means transports the automobile and within which envelope said industrial manipulator is capable of movement through coordinates defined by X, Y and Z axes and rotation about said axes, said industrial manipulator including controller means programmed for movement through a predetermined routine for the retrieval and delivery of the component part from a storage location to a first predetermined location within the work envelope, said controller means including means for introducing real-time incremental changes thereto, said industrial manipulator further including end effector means for acquiring the component part from the storage location and inserting the acquired component prt into the component part opening of the apparatus;

first means for generating a first signal indicating that the automobile on the conveyance means has entered the work envelope of said industrial manipulator;

second means in communication with the robot controller for generating a second signal representative of the travel of said conveyance means through the work envelope, said robot controller being responsive to said second signal whereby the travel of the apparatus relative to the X axis is monitored and movement of the industrial manipulator along the X axis of the envelope is coordinated;

third means for generating a third signal indicative of at least the gross position of the automobile with respect to the Y axis of the work envelope, said robot controller being responsive to said third signal whereby the location of the apparatus with respect to the Y axis is monitored and positioning of the industrial manipulator along the Y axis is coordinated;

fourth means for generating a fourth signal indicative of at least the gross position of the apparatus with respect to the Z axis of the work envelope, said robot control being responsive to said fourth signal wherein the location of the automobile with respect to the Z axis is monitored and positioning of the industrial manipulator along the Z axis is coordinated thereby;

fifth means operatively associated with the end effector of said industrial manipulator for accurately locating the component part opening for the insertion of the component part thereinto, said fifth means generating a fifth signal; and computer means responsive to at least said second, third, fourth and fifth signals and programmed to provide an input to said controller means including means for introducing real time incremental changes thereto, wherein said controller means effects the positioning of said industrial manipulator from said first predetermined location within the work envelope to a second location within the work envelope, said second location being a predetermined position of said industrial manipulator with respect to the component part as a result of said second, third, fourth and fifth signals and which positions the acquired component part in a predetermined spaced relationship with respect to the component part regardless of the orientation of the apparatus, wherein insertion of the component part is effected by said controller means programmed for movement through a predetermined routine between said second location and the component part opening of the apparatus.

6. The work station for inserting a component part into an apparatus according to claim 5 wherein the third means for generating a third signal indicative of at least the gross position of the apparatus with respect to the Y axis of the work envelope is an ultrasonic sensor means.

7. The work station for inserting a component part into an apparatus according to claim 5 wherein the fourth means for generating a fourth signal indicative of at least the gross position of the apparatus with respect to the Z axis of the work envelope is an ultrasonic sensor means.

8. The work station for inserting a component part into an apparatus according to claim 5 wherein the fifth means operatively associated with the end effector of the industrial manipulator for locating the windshield opening of the apparatus comprises a vision system including cameras.

9. A work station for inserting a windshield into the windshield opening of an automobile which is disposed in a somewhat random orientation on a conveyance means for continuous transportation through one or more work stations comprising:

an industrial manipulator means defining a work envelope through which the conveyance means transports the automobile and within which envelope said industrial manipulator is capable of movement through coordinates defined by X, Y and Z axes, said industrial manipulator including controller means programmed for movement through a predetermined routine for the retrieval and delivery of the windshield from a storage location to a first predetermined location within the work envelope, said controller means including means for introducing real-time incremental changes thereto, said industrial manipulator further including end effector means for acquiring the windshield from the storage location and inserting the acquired windshield into the windshield opening of the automobile;

first means for generating a first signal indicating that the automobile on the conveyance means has entered the work envelope of said industrial manipulator;

encoder means in communication with the robot controller for generating a second signal representative of the travel of said conveyance means through the work envelope, said robot controller being responsive to said second signal whereby the travel of the automobile relative to the X axis is monitored and movement of the industrial manipulator along the X axis of the envelope is coordinated;

ultrasonic sensor means for generating a third signal indicative of at least the gross position of the automobile with respect to the Y axis of the work envelope, said robot controller being responsive to said third signal whereby the location of the automobile with respect to the Y axis is monitored and positioning of the industrial manipulator along the Y axis is coordinated;

ultrasonic sensor means for generating a fourth signal indicative of at least the gross position of the automobile with respect to the Z axis of the work envelope, said robot control being responsive to said fourth signal wherein the location of the automobile with respect to the Z axis is monitored and positioning of the industrial manipulator along the Z axis is coordinated thereby;

vision system means including cameras operatively associated with the end effector of said industrial manipulator for accurately locating the windshield opening for the insertion of the windshield thereinto, said fifth means generating a fifth signal; and computer means responsive to at least said second, third, fourth and fifth signals and programmed to provide an input to said controller means including means for introducing real time incremental changes thereto, wherein said controller means effects the positioning of said industrial manipulator from said first predetermined location within the work envelope to a second location within the work envelope, said second location being a predetermined position of said industrial manipulator with respect to the automobile as a result of said second, third, fourth and fifth signals and which positions the acquired windshield in a predetermined spaced relationship with respect to the windshield opening regardless of the orientation of the automobile, said predetermined relationship being such that said industrial manipulator with the acquired windshield is spaced in a non-contact relationship with the windshield opening and the automobile wherein insertion of the windshield is effected by said controller means programmed for movement through a predetermined routine between said second location and the windshield opening of the automobile.

* * * * *